United States Patent [19]

Swartz

[11] Patent Number: 5,709,064

[45] Date of Patent: Jan. 20, 1998

[54] METHOD AND DEVICE FOR COVERING CROP BALES

[76] Inventor: Denny M. Swartz, Star Rte., Box 29, Reno, Ohio 45773

[21] Appl. No.: 720,409

[22] Filed: Sep. 27, 1996

[51] Int. Cl.$^6$ .............. B65B 11/02; B65B 67/00; B65D 71/00; E04D 1/34
[52] U.S. Cl. .............. 53/399; 53/390; 53/414; 53/592; 52/3; 52/5; 66/117; 206/83.5
[58] Field of Search .............. 206/83.5; 53/399, 53/397, 592, 390, 449, 138.6, 139.4, 528, 176, 414; 52/23, 3, 4, 5; 56/DIG. 18, 432; 66/117, 116, 118, 1 R

[56] References Cited

U.S. PATENT DOCUMENTS

| 228,404 | 6/1880 | Smith | 66/118 |
|---|---|---|---|
| 607,253 | 7/1898 | Lyons | 66/118 |
| 677,832 | 7/1901 | Wickham | 66/118 |
| 726,758 | 4/1903 | Reuther | 66/116 |
| 2,024,794 | 12/1935 | Carlson | 66/118 |
| 2,093,631 | 9/1937 | Burnham | 66/118 |
| 2,866,494 | 12/1958 | Sanderson | 154/14 |
| 4,221,085 | 9/1980 | Conaghan | 52/4 |
| 4,248,343 | 2/1981 | Schaefer | 52/3 |
| 4,409,784 | 10/1983 | VanGinhoven et al. | 56/341 |
| 4,483,127 | 11/1984 | Forkner | 53/592 X |
| 4,641,484 | 2/1987 | Popelka | 53/399 |
| 4,712,672 | 12/1987 | Roy et al. | 206/83.5 X |
| 4,897,970 | 2/1990 | Double et al. | 52/4 |
| 5,197,236 | 3/1993 | Calhoun et al. | 52/4 |
| 5,465,559 | 11/1995 | Heiner et al. | 53/567 |

*Primary Examiner*—James F. Coan
*Attorney, Agent, or Firm*—Paul E. Milliken; Lee A. Germain

[57] ABSTRACT

A method and device for attaching a covering sheet material on top of a row of crop bales positioned in end to end relationship on a raised earthen mound. An elongated needle is used to insert strands of tie material under the bales and then the tie material is pulled up over the top surface of a cover sheet on the top of the bales. The strands of tie material are then tied in position to encircle the bales and the cover sheet to hold it is position on at least the top half of the bale with the lower portion of the bale being left uncovered for air circulation. The cover sheet is also tied to extend over the top portion of the ends of the bale row.

24 Claims, 2 Drawing Sheets

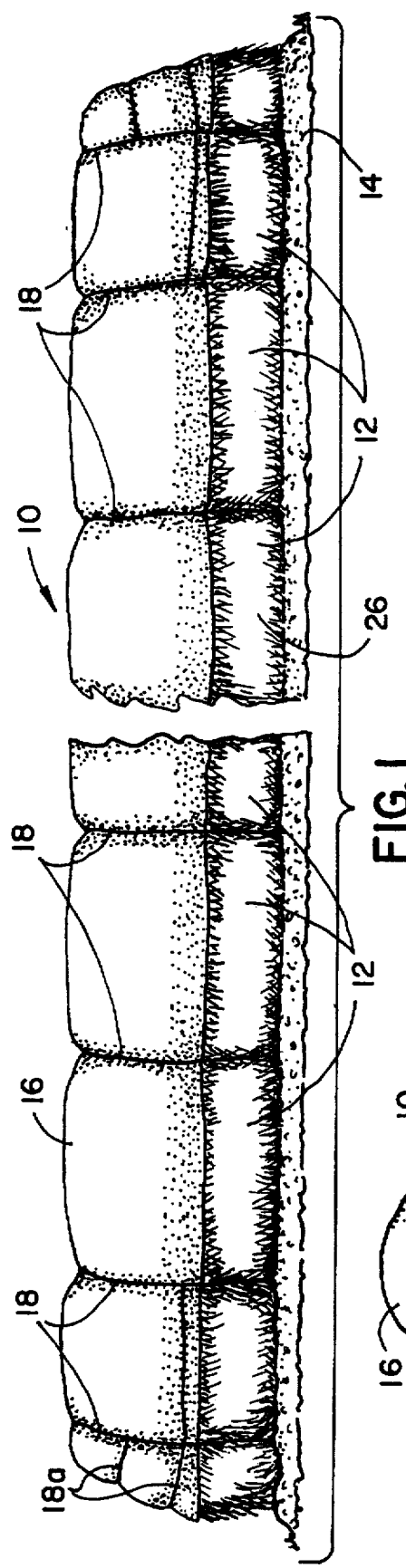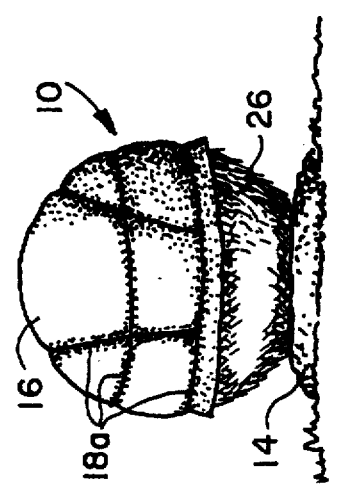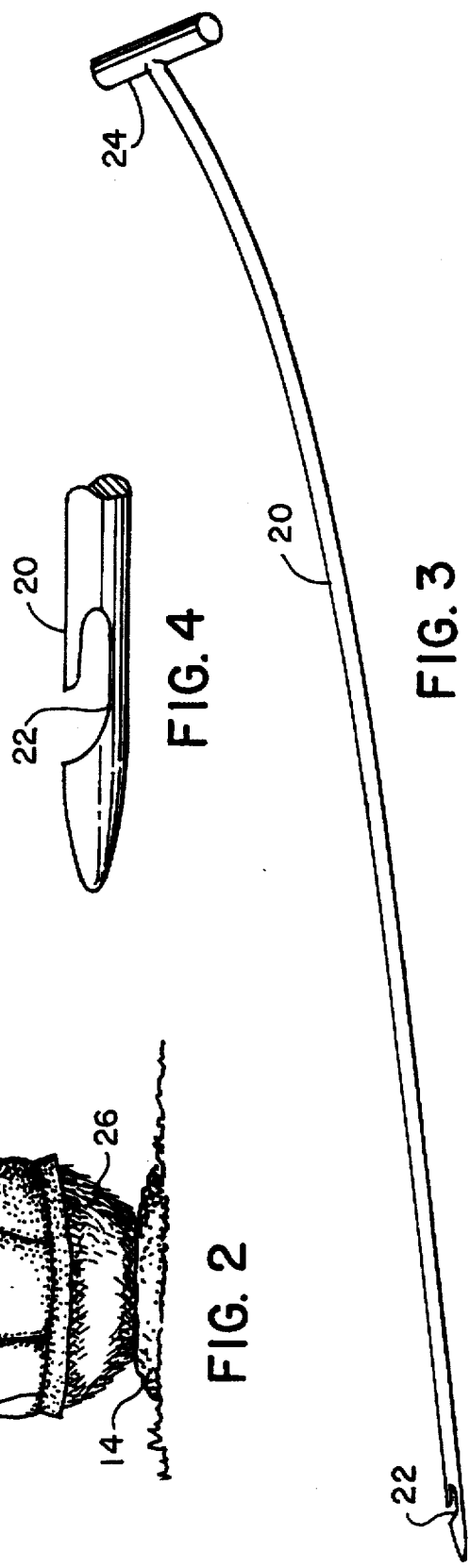

METHOD AND DEVICE FOR COVERING CROP BALES

FIELD OF THE INVENTION

This invention relates to the field of covering crop bales stored outside in a field and in particular to covering bales of crop material such as hay which are rolled into cylindrical bales and laid on their side in end to end rows.

BACKGROUND OF THE INVENTION

In the past various types of baling machines have been devised for wrapping cover sheet material around bales of hay or other crop material. This sheet material is waterproof and is usually plastic and a stretch cling-type plastic is often used with a wrapping machine such as those shown in U.S. Pat. No. 4,409,784 issued to R. M. VanGinhoven et al and U.S. Pat. No. 4,641,484 issued to F. E. Popelka. These wrapping machines wrap the cover sheet around the entire circumference of the roll bale and the ends are also often covered.

While such a wrapping keeps the rain from penetrating the bale it seals in any existing moisture in the bale and does not provide air circulation which would dry out the bale. This can result in rotting and mold over the length of time that the bale may be stored and can result in at least part of the crop being unusable as feed for livestock. The present invention solves this problem by providing a means of covering the bales from the rain while permitting air circulation through the bales so that moisture will not become trapped in the bales.

OBJECTS OF THE INVENTION

It is an object of the present invention to provide a simple inexpensive method and device for covering roll bales of crop material for storage in a open field which will protect the bales from rain and snow while providing ventilation for drying out the bales.

Another object of the invention is to provide a special tool for inserting tie strands such as twine or cords beneath roll type crop bales which are lying on their sides on the ground which tie strands extend to both sides of the rolls and are brought up over the top of the roll to hold a top cover on the rolls.

Another object of the invention is to provide a kit for covering crop bales, the kit containing, cover sheet material, tie strand material, an insertion needle for positioning the tie strands under crop bales, and instructions for using the materials.

These and other objects of the invention will become more apparent in the following specification and the attached drawings.

SUMMARY OF THE INVENTION

This invention is a method of covering bales of crop material with waterproof sheet material comprising: providing a raised mound of earthen material on the surface of the ground, placing a plurality of bales of crop material on top of the mound, placing a flexible waterproof cover sheet material over a top portion of the bales, using a special elongated needle to insert strands of tie material to extend under the bales and bringing the strands of tie material up around the bales and over the top of the cover sheet, and tying the strands to hold the cover sheet in position on the top portion of the bales. The invention also includes a kit containing cover material, tie strand material, an elongated strand insertion needle and instructions for using the materials in the kit.

DESCRIPTION OF THE DRAWINGS

FIG. 1 is a side elevational view of a row of crop bales covered for storage in an open field in accordance with the invention;

FIG. 2 is an end view of the row of crop bales show in FIG. 1;

FIG. 3 is a perspective view of an elongated needle for inserting strands of tie material beneath the crop bales;

FIG. 4 is an enlarged fragmentary view of the front end of the needle of FIG. 3 showing in more detail the slotted end;

DESCRIPTION OF THE PREFERRED EMBODIMENTS

Figure 5:
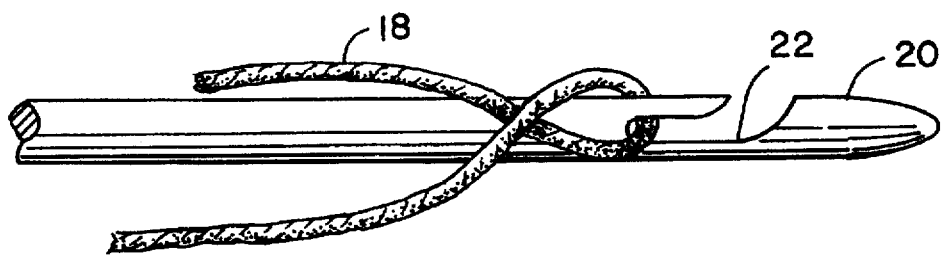
FIG. 5 is an enlarged fragmentary view of the slotted end of the needle of FIG. 3 with a piece of tie strand material looped through the slotted end of the needle.

Referring now to the drawings and in particular to FIGS. 1 and 2, a covered row of crop roll bales is indicated generally by the numeral 10. The row 10 is made up from placing a number of crop roll bales 12, such as hay or other crops in end to end relationship on a raised mound 14 of earthen material. The purpose of this mound is raise the bales 12 above the level of the ground to provide drainage of water at the bottom of the bales.

The entire row 10 is covered at the top portion by a cover sheet 16 made preferably of plastic film such as stretch cling type or any other type plastic film of sufficient strength and thickness to withstand the wind and weather conditions and last for the length of time the bales will be stored. A 6 mil black plastic sheet material such as polyethylene has been found to be useful as a cover sheet for the bales 12, however there are a number of different types of plastic sheet material that would also work well for this purpose.

In order to retain the cover sheet 16 on the bales 12, a series of tie strands 18 of twin, cord or other suitable material is inserted under the bales 12 next to the earthen mound 14 by a needle 20 as shown in FIGS. 3–6 and extend outwardly on either side of the bales 12 where they may be pulled up over the cover sheet 16 and tied to hold them in place. The ends of the rows 10 can be covered by the cover sheet 16 and can be tied by strands 18a extending around the ends of the rows as shown in FIGS. 1 and 2.

Figure 6:
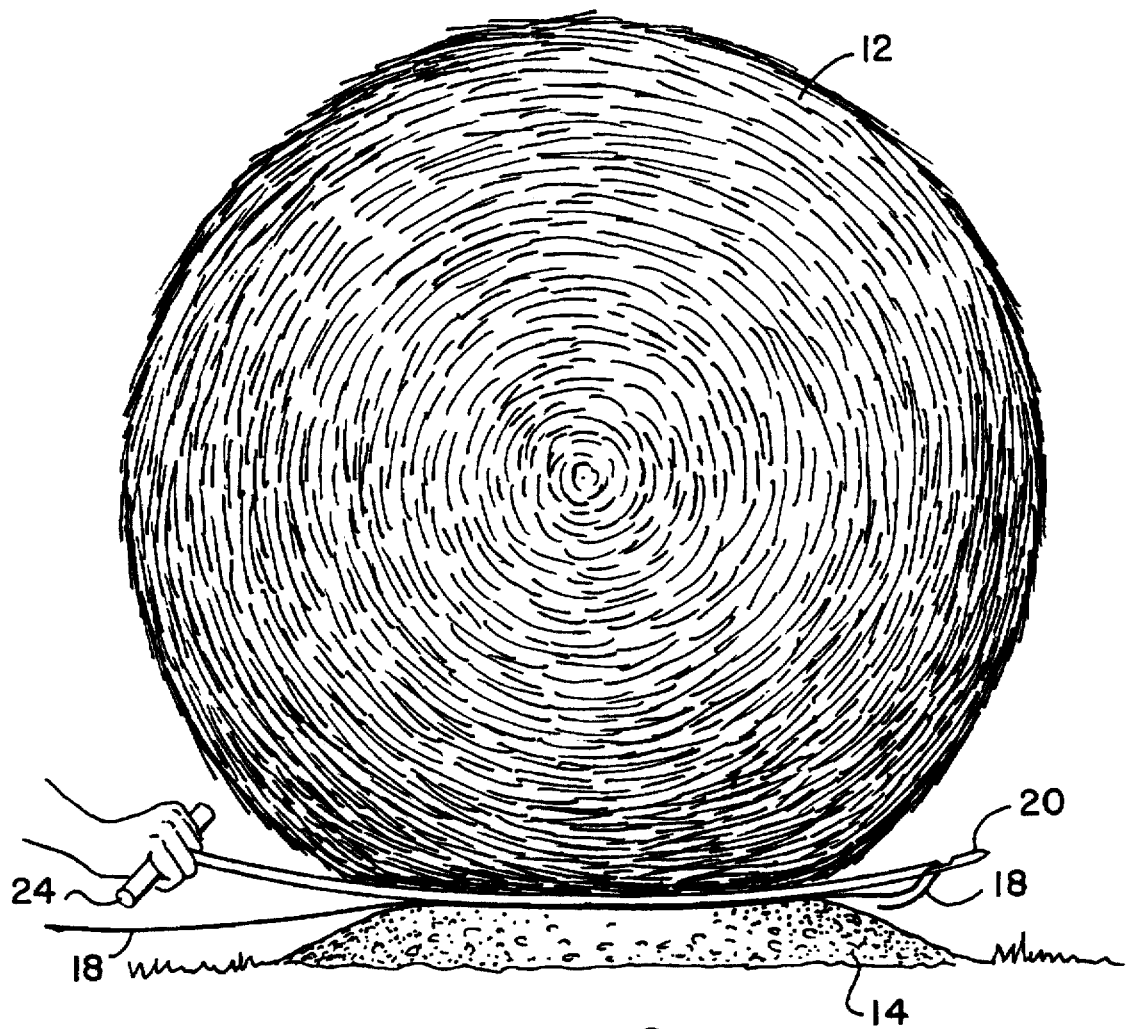
FIG. 6 is an end view of a crop roll showing how the needle of FIG. 3 is used to insert a strand of tie material underneath a crop roll so that it extends outwardly on each side of the roll for bringing the strand over to top of the roll to tie the cover on the roll.

The needle 20 has a forwardly facing slot 22 on the front end and a handle 24 on the back end. The tie strand 18 is looped around the needle at the front end slot 22 as shown in FIG. 5 or can be tied in a knot or wrapped around the needle in the area of the slot 22 if necessary to secure the tie strand 18 to the front end of the needle 20 while the needle is being pushed beneath the crop bale 12 as shown in FIG. 6.

In carrying out the method of the invention, the elongated earthen mound 14 is formed by a plow or other means and is preferably about 4" to 6" above the ground level. This should raise the bales 12 to a sufficient height above the ground that they will drain properly and not trap any water at the bottom of the bale. The bales 12 are then placed in an end to end row 10 on top of the mound 14. The elongated needle 20 is then used as shown in FIG. 6 to insert the tie strands under the bales 12. The needle 20 is 5' or more long, ⅛" or more in diameter and has a handle about 5" long extending transversely across the rear end of the needle. The main requirements of the needle 20 is that it be long enough to pass the tie strands 18 entirely underneath the bales 12 and that it be sufficiently rigid to enable it to be pushed underneath the bales 12 between the bales and the earthen mound 14. It has been found that it is easier to insert the needle 20 between the ends of the bales since the crop material is not as compacted in this area.

In any event it is important that an open area 26 be left at the bottom of the bales to permit air circulation for drying out the bales 12. The cover sheet 16 should extend at least halfway down on the bales so that the widest diameter of the bales is covered by the cover sheet. The cover sheet 16 can extend farther than half-way down on the bales, so long as a sufficient open space is left to provide air circulation for drying the bales.

The needle 20 may be varied slightly in diameter between the front end and the rear end containing the handle 24. For example the diameter at the front end may be at least ⅜" and may gradually increase along the length of the needle shaft to a diameter of ½" or more at the rear end where the handle is attached. This increase in diameter toward the handle end provides a stiffer needle and also provides greater needle surface area for attachment to the handle. Since such taper would be very slight, a tapered needle would still resemble the needle 20 in FIGS. 3 and 6.

Various other modifications can be made in the type of tie strands and cover sheets used and in the elongated needle without departing from the scope of the invention.

I claim:

1. A method of covering bales of crop material with waterproof sheet material comprising:
    providing a raised mound of earthen material on the surface of the ground;
    placing a plurality of bales of crop material on top of the mound;
    placing a flexible waterproof cover sheet material over a top portion of the bales;
    inserting strands of tie material to extend under the bales and bringing the strands of tie material up around the bales and over the top of the cover sheet; and
    tying the strands to hold the cover sheet in position on the top portion of the bales.

2. The method of claim 1 including the step of terminating the cover sheet short of the bottom of each bale on each side thereof to leave an uncovered strip along each side of each bale to permit air circulation through the bale.

3. The method of claim 1 wherein the cover sheet is extended to at least the widest portion of each bale in the transverse direction of the bale.

4. The method of claim 1 including the step of placing the cover sheet to extend over the ends of the bales and bringing strands of tie material around the outer surface of the cover sheet at the ends of the bales to hold the cover sheet in position on such ends.

5. The method of claim 1 including the step of using an elongated needle to move the strands of tie material under the bales after they have been placed on the earthen mound.

6. The method of claim 1 wherein the bales of crop material are placed end to end in a row on the earthen mound.

7. The method of claim 1 wherein the bales are cylindrical shaped rolls.

8. The method of claim 1 wherein the waterproof cover sheet is a plastic material.

9. The method of claim 1 wherein the tie material is baling twine.

10. A method of covering bales of crop material with waterproof sheet material comprising:
    providing an elongated raised mound of earthen material on the surface of the ground;
    placing heavy tie strings transversely across the earthen mound near each end thereof;
    placing a row of cylindrical bales of crop material in end to end relationship on the earthen mound;
    laying a flexible waterproof cover on top of the bales to cover at least the top half of the bales along the entire length of the row and extending down over outer ends of the endmost bales in each row to cover at least the top half of the ends;
    bringing the heavy tie strings over the cover material, and tying the ties strings in place to retain the cover on the bales;
    inserting strands of baling twine under the bales at various spaced locations along the length of the row and bringing the strands of baling twine over the top of the cover; and
    tying the strands of baling twine to further retain the cover in position on top of the bales.

11. The method claimed in claim 10 including the step of using an elongated needle to pass under the bales and insert the baling twine in position with respect to the bales.

12. The method claimed in claim 10 including the step of tying baling twine around the ends of the row of bales and attaching it to the heavy tie strings which extend around the end bales of the row.

13. A needle for inserting strands of tie material under a bale of crop material, the needle comprising:
    an elongated shaft of sufficient length to pass under a bale of crop material and extend from both sides of a bale when inserted thereunder;
    the shaft having a gripping handle on a rear end thereof; and
    an open slotted tie strand retaining portion at a forward end thereof;
    the shaft of said needle being sufficiently rigid to permit it to be inserted under a crop bale row and to pass from one side of a bale to the other and to retain its linear shape while pulling a strand of tie material through the bale.

14. A needle as claimed in claim 13 wherein the needle is curved in an arcuate shape substantially throughout its length.

15. A needle as claimed in claim 13 wherein the needle is at least 5' in length and at least ⅛" in diameter.

16. A needle as claimed in claim 13 wherein the open slotted portion of the needle has a forward facing hook for engaging a strand of tie material.

17. A needle as claimed in claim 13 wherein the needle shaft tapers from a smaller diameter at the front end to a larger diameter at the rear end.

18. A needle as claimed in claim 17 wherein the diameter of the shaft at the front end is at least ⅜" and the diameter of the shaft at the rear end is at least ½".

19. A Kit for covering bales of crop material comprising:
    an elongated needle having a handle on one end and a tie strand receiving slot in the opposite end;
    a supply of tie strand material;

a supply of waterproof flexible cover sheet material; and an instruction sheet giving directions how to use the kit materials to position and cover a row of bales of crop material in such manner as to provide air circulation through the bales.

20. A cover system for cylindrical crop bales laid in end to end relationship to form an elongated row, the cover system comprising:

flexible waterproof cover sheet means positioned to extend for the entire length of the row of bales and extending to cover at least a top half of the bales along both sides of the row and at least the top half of the ends of the row;

the cover sheet means terminating a selected distance above the surface of the ground on which the bales are laid to permit air circulation through the bale;

a plurality of flexible tie strands extending under and around the bales and over the cover sheet means at spaced locations along the length of the row of bales to retain the sheet means in position; and an elongated needle of sufficient length and stiffness to permit it to be inserted under the bales to position the tie strands in the desired position relative to the bales and the cover sheet means.

21. The system of claim 20 wherein the tie strands are heavier at each end of the row of bales than in other locations along the length of the bales.

22. The system of claim 20 wherein the needle is curved in an arcuate shape substantially throughout its length and is at least 5' in length and at least ⅛" in diameter.

23. The system of claim 20 wherein the needle tapers from a smaller diameter at the front end to a larger diameter at the rear end.

24. The system of claim 23 wherein the diameter of the needle at the forward end is at least ⅜" and the diameter of the needle at the rear end is at least ½".

* * * * *